Dec. 4, 1962 L. W. MORGAN 3,067,014
CONTROL SYSTEM FOR NITRIC ACID PLANT
Filed Dec. 1, 1958 3 Sheets-Sheet 1

INVENTOR.
L.W. MORGAN
BY Hudson and Young
ATTORNEYS

Dec. 4, 1962     L. W. MORGAN     3,067,014
CONTROL SYSTEM FOR NITRIC ACID PLANT
Filed Dec. 1, 1958     3 Sheets-Sheet 2

INVENTOR.
L.W. MORGAN
BY Hudson and Young
ATTORNEYS

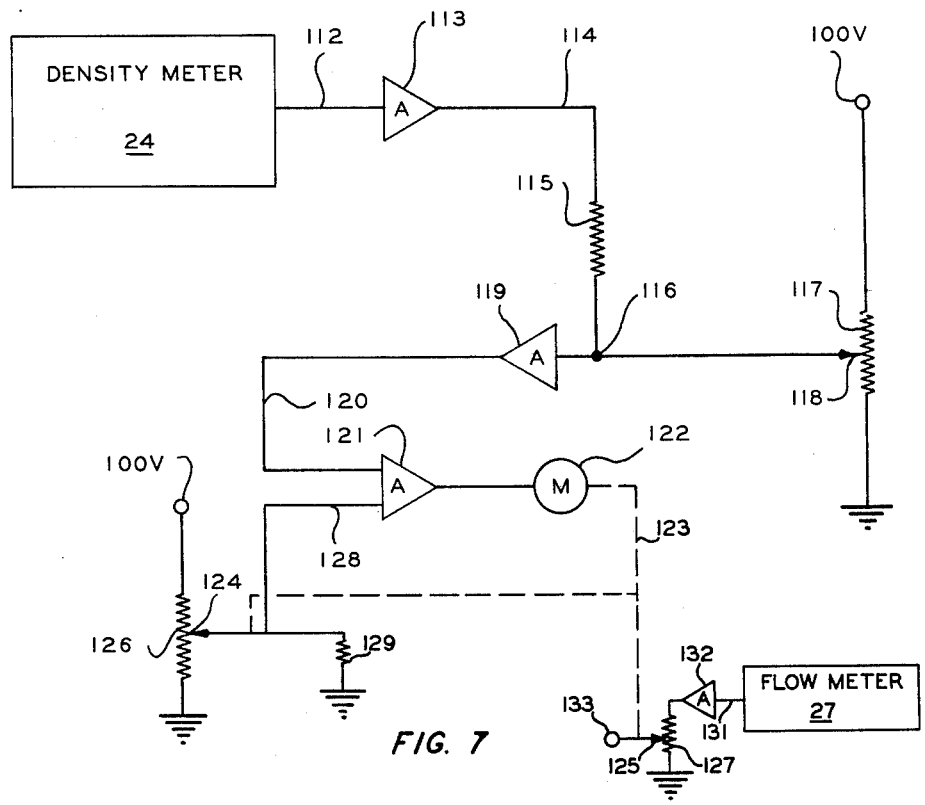
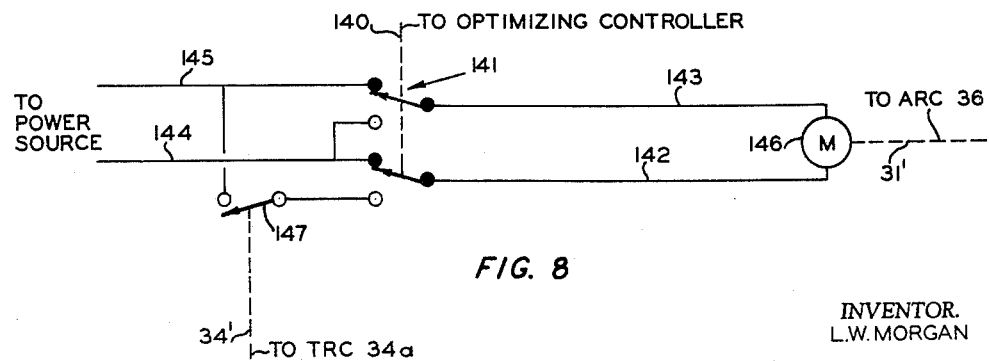

United States Patent Office 3,067,014
Patented Dec. 4, 1962

3,067,014
CONTROL SYSTEM FOR NITRIC ACID PLANT
Lyman W. Morgan, Golden, Colo., assignor to Phillips Petroleum Company, a corporation of Delaware
Filed Dec. 1, 1958, Ser. No. 777,246
6 Claims. (Cl. 23—253)

This invention relates to the manufacture of nitric acid. In one aspect it relates to an improved method for control of the process of manufacturing nitric acid by oxidation of ammonia. In another aspect the invention relates to a control system which provides maximum production of nitric acid at maximum efficiency.

It is well known that, in the production of nitric acid from ammonia, the ammonia gas is first catalytically oxidized to oxides of nitrogen, principally nitric oxide, and the oxides of nitrogen produced together with an excess of air, with which the nitric oxide reacts to form nitrogen dioxide, are subsequently adsorbed in water to produce nitric acid. In the usual process for the production of nitric acid from ammonia, the gases, rich in nitric oxide, from the oxidation chambers in which the ammonia is oxidized, are passed under atmospheric or higher pressure together with an excess of air into an oxidation chamber, where the nitric oxide is oxidized to nitrogen dioxide. The nitrogen dioxide-containing gas mixture is then passed through an absorption column, in countercurrent flow relationship to a current of water, and the resuulting nitric acid is recovered from the process.

It is recognized that to obtain maximum efficiency from the process it is essential that the ratio of ammonia to air in the ammonia oxidation reaction and the amount of air consumed in the entire process be rigidly controlled. Unintentional changes in flow rates, caused by such simple factors as a drop in the voltage or frequency of the electrical power supply, may effect a variation in the ratio of ammonia to air with its consequent effect upon the efficiency of the process. Also, intentional changes in flow rates to control the rate of manufacture are sometimes necessary. Heretofore, when such a change in rate of manufacture was to be made, it was necessary to regulate the amount of ammonia, to change the amount of air to that necessary under the new conditions, and to guard against overheating of the catalyst, and to manually and experimentally harmonize all these factors was difficult and time-consuming.

In the process for the manufacture of nitric acid from ammonia as known to the art, it has been the usual practice to control these variables separately. It has been the usual practice to control these variables by instruments set at a predetermined value.

It is an object of this invention to provide a system of control for the manufacture of nitric acid wherein the maximum amount of nitric acid is produced at maximum efficiency.

It is also an object of this invention to provide a method for controlling the ratio of oxygen to ammonia to maintain the oxidation of ammonia at maximum efficiency.

A further object of the invention is the provision of a method for controlling the temperature of the feed to the ammonia oxidation reaction at a temperature sufficient to maintain maximum conversion in the oxidation reaction.

Still another object of this invention is the provision of a method for automatically controlling the ratio of air and ammonia to obtain maximum efficiency of the oxidation step and to automatically control the amount of air to the process so as to obtain maximum production of nitric acid.

Other objects and davantages of my invention will be apparent from the disclosure and description herein.

My invention can be more fully understood by referring to the accompanying drawing wherein:

FIGURE 7 is a diagram of the circuit of the production meter 29 of FIGURE 1, and FIGURE 8 illustrates the operation of the temperature limit switch.

Figure 2:
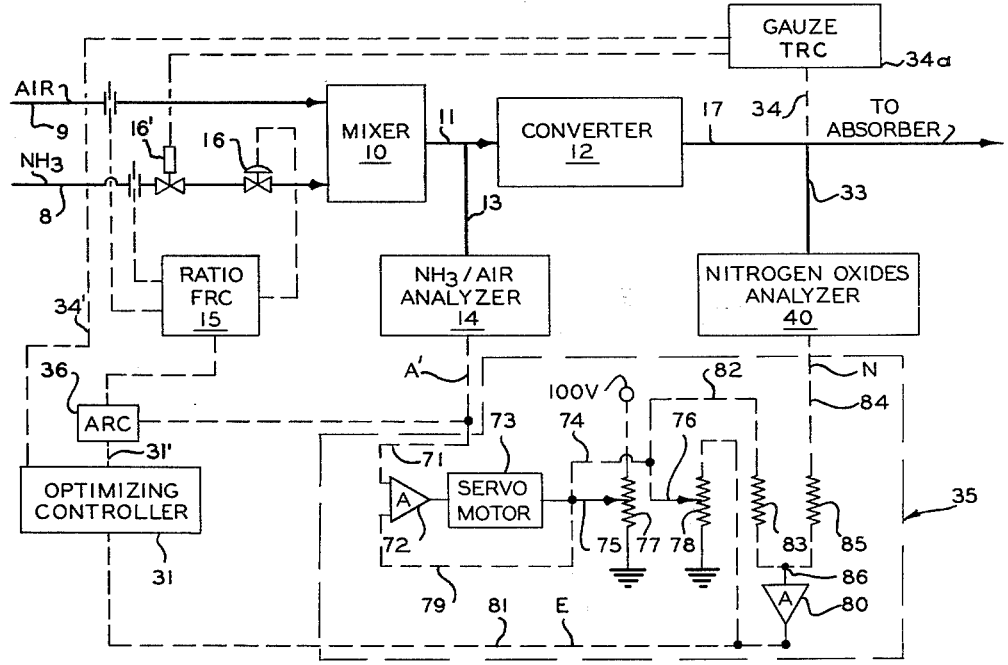
FIGURE 2 is a schematic flow diagram of an embodiment of the invention as applied to obtaining maximum efficiency of the ammonia oxidation step.

Broadly, the invention contemplates a method and means for controlling a nitric acid plant at maximum efficiency and at a maximum production rate. This is accomplished by controlling the air admitted to the air and ammonia converter so as to produce maximum production of nitric acid, controlling the ratio of ammonia and air by controlling the ammonia stream to the converter so as to obtain maximum efficiency of the catalyst in the converter, and by controlling the temperature of the mixture of gases passing to the converter so as to obtain maximum efficiency of the catalyst.

The control instruments employed are either commercially available control instruments and are so designated or are described with sufficient specificity so that one skilled in the art can construct same.

Various pieces of conventional equipment, for example, pumps, filters, valves, and the like, other than those required for an understanding of my invention, have not been included in this drawing, but the inclusion of such equipment is within the scope of my invention and can readily be supplied by those skilled in the art.

In the description of the various figures of the drawing, like elements will be referred to by like numerals.

Figure 1:
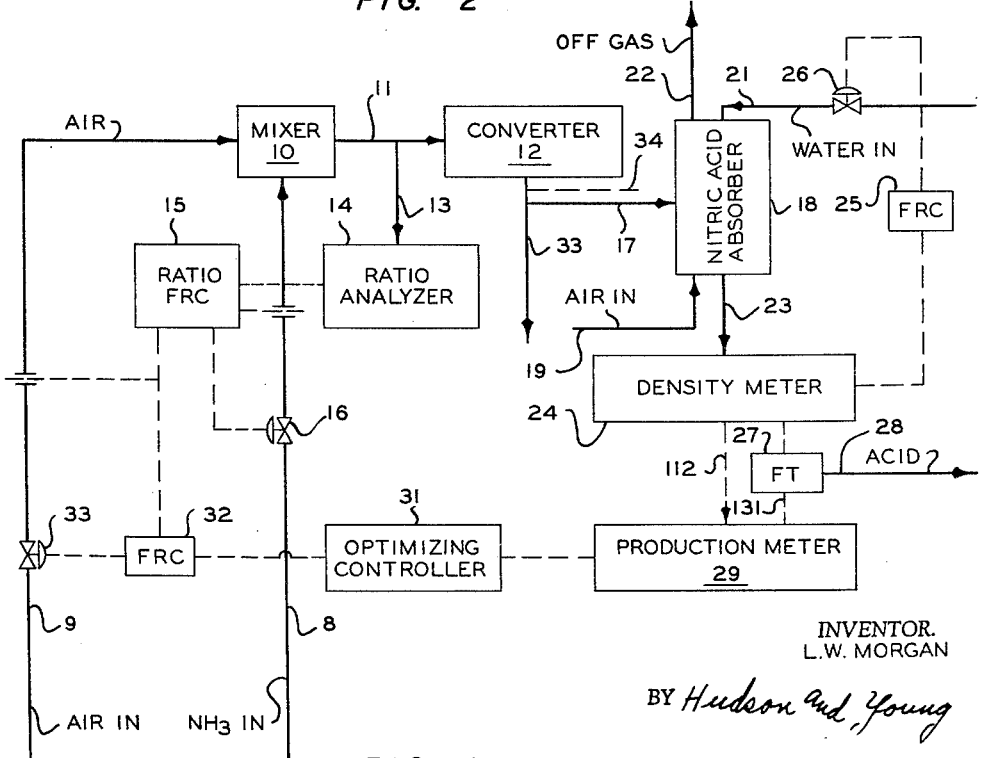
FIGURE 1 is a schematic flow diagram of a nitric acid plant including the elements essential to carrying out of my invention as applied to the control of the feed to the process.

Referring now to the drawing, and particularly to FIGURE 1, ammonia enters mixer 10 via conduit 8 and air enters mixer 10 via conduit 9. Thoroughly mixed air and ammonia pass via conduit 11 to converter 12 wherein ammonia is oxidized to produce oxides of nitrogen. A sample of the mixture is passed via conduit 13 to ratio analyzer 14, which can be, for example, a differential thermal conductivity measurement instrument. The signal from analyzer 14 manipulates ratio flow recording controller 15 which controls motor valve 16 in conduit 8 so as to provide the correct amount of ammonia to mixer 10. The effluent from converter 12 passes via conduit 17 to absorber 18 wherein $NO_2$ is absorbed in water to form nitric acid and NO and the NO is oxidized to $NO_2$ by the oxygen in air introduced to absorber 18 via conduit 19. Absorber 18 can be any conventional absorption column known in the art. Normally, all of the compressed air not required by conduit 9 is passed to absorber 18 via a bleach column which, for purpose of describing the process, can be considered the lower portion of absorber 18. Water is introduced to absorber 18 via conduit 21 and off gases are removed from absorber 18 via conduit 22.

The nitric acid production from absorber 18 flows via conduit 23 through a concentration or density meter 24, which can be a Densitrol (trademark) available from the Precision Thermometer and Instrument Company, Philadelphia, Pennsylvania. A signal from concentration meter 24 manipulates flow recording controller 25 which operates a motor valve 26 in water supply line 21. The effluent from concentration meter 24 flows through a flow transmitter 27 and the product acid is removed from the plant via conduit 28. A signal from flow transmitter 27 is passed to production meter 29 and a signal from concentration meter 24 is also passed into production meter 29 which comprises a multiplying circuit so that a signal passed from production meter 29 is indicative of the production of the plant. The signal from production meter 29 is passed to optimizing controller 31. The optimizing controller is preferably a Quarie Optimal Controller, hereinafter described in more detail. The signal from optimizing controller 31 manipulates flow recording controller 32 so as to adjust motor valve 33 to supply the proper amount of air for maximum production of nitric acid. The adjusted flow through conduit 9 is sensed by ratio flow recording controller 15 and the flow of ammonia through conduit 8 is correspondingly adjusted.

The optimizing controller periodically adjusts the flow of air to the converter and compares nitric acid production rate after the adjustment with the production rate prior to the adjustment. The optimizing controller then selects the flow of air which produces the maximum production rate.

In FIGURE 2 air and ammonia enter mixer 10 via conduits 8 and 9 and the mixture is passed to converter 12 as in FIGURE 1. A sample of the air-ammonia mixture is passed via conduits 11 and 13 to ratio analyzer 14 which is the same as ratio analyzer 14 of FIGURE 1. The signal from ratio analyzer 14 is passed to catalyst efficiency computer 35, hereinafter described in more detail. A sample of the effluent of converter 12 is passed via conduits 17 and 33 to nitrogen oxides analyzer 40, hereinafter described more fully, and a signal from nitrogen oxides analyzer 40 is also passed to catalyst efficiency computer 35. The output signal from ratio analyzer 14 is also connected to analyzer recorder controller 36. The signal from catalyst efficiency computer 35 is passed via conductor 81 to optimizing controller 31. Optimizing controller 31 manipulates analyzer recorder controller 36 to control the ratio of ammonia and air going to mixer 10 so as to provide maximum efficiency of converter 12. Thermocouple 34 detects the temperature of the effluent of converter 12 and passes a signal to temperature recorder controller 34a which manipulates a switch in optimizing controller 31 to prevent a further increase in the ammonia going to mixer 10 when the temperature of the converter 12 effluent approaches the maximum temperature tolerated by the catalyst, as shown in FIGURE 8. In case the effluent temperature of converter 12 reaches a predetermined maximum which is higher than that at which optimizer 31 operates to prevent a further increase in the ammonia to mixer 10 the signal from thermocouple 34 opens a circuit, which maintains solenoid valve 16' in open position, so as to close valve 16'. This stops the flow of ammonia and the reaction ceases. Valve 16' is reset manually. The temperature can exceed the maximum tolerated by the catalyst if the air supply is decreased by stoppage in the air line or by the malfunctioning of a valve or by other causes.

The optimizing controller periodically adjusts the flow of ammonia passing to the converter 12 and compares the efficiency of the catalyst after the adjustment with the efficiency of the catalyst before the adjustment. The optimizing controller then selects the flow of ammonia which results in maximum catalyst efficiency. The maximum catalyst efficiency of the catalyst in converter 12 is the maximum amount of oxides of nitrogen produced per unit amount of ammonia supplied to the converter.

Figure 3:
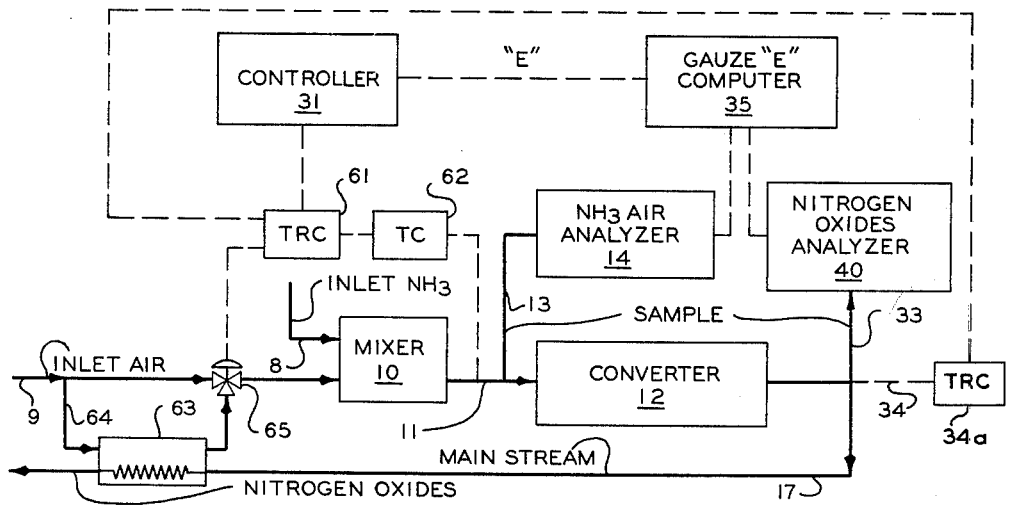
FIGURE 3 is a modification of the system shown in FIGURE 2.

In FIGURE 3 air and ammonia enter mixer 10 via conduits 8 and 9 and the mixture is passed to converter 12, as in FIGURES 1 and 2. A sample of the air-ammonia mixture is passed via conduits 11 and 13 to ratio analyzer 14. The ratio analyzer 14 is the same as in FIGURES 1 and 2. The signal from analyzer 14 is passed to catalyst efficiency computer 35, described hereinafter. A sample from the converter effluent line 17 is taken via conduit 33 to nitrogen oxides analyzer 40, hereinafter described more fully, and the signal from analyzer 40 is also passed to catalyst efficiency computer 35. The signal from computer 35 is passed to optimizing controller 31 which manipulates temperature recording controller 61. The hot effluent from converter 12 passes via conduit 17 through heat exchanger 63. Thermocouple 62 transmits the temperature of the feed to converter 12 to temperature recording controller 61. A portion of the inlet air is by-passed from conduit 9 via conduit 64 and heat exchanger 63 according to the position of motor valve 65 which connects conduits 9 and by-pass conduit 64. Temperature recording controller 61 controls the position of motor valve 65 in accordance with the signal received from optimizing controller 31. Thermocouple 34 transmits the temperature of the effluent from converter 12 to temperature recording controller 61 which is set to position valve 65 to minimize or terminate flow through line 64 when the maximum temperature tolerated by the catalyst is approached. Thermocouple 34 is not controlling when temperatures below the maximum temperature tolerated by the catalyst are prevalent. In operation the optimizing controller is a temperature controller and controls the temperature of the feed to converter 12 so as to obtain optimum efficiency of the catalyst by passing a sufficient amount of inlet air through heat exchanger 63 to maintain the feed to the converter at the proper temperature. The optimizing controller periodically adjusts the temperature of the feed to converter 12, within the limits tolerated by the catalyst, compares the efficiency of the catalyst after the adjustment with the efficiency prior to the adjustment and selects the feed temperature which results in maximum catalyst efficiency.

The circuitry of the catalyst efficiency computer 35 will now be described as shown in FIGURE 2 wherein A' represents the signal from ratio analyzer 14, N represents the signal from nitrogen oxides analyzer 40 and E represents the signal from the catalyst efficiency computer. A signal A' from the ammonia-air analyzer 14 passes by means of conductor 71 to servo amplifier 72, which drives servo motor 73 and its associated mechanical linkage 74. The linkage moves contactors 75 and 76 of potentiometers 77 and 78, respectively. Potentiometer 77 is connected at one end to a voltage source, for example, 100 volts, and at the other end to ground. Contactor 75 supplies a feedback signal to amplifier 72 by means of conductor 79. The aforementioned components form a self-balancing divider, in that the relative shaft positions of motor 73 represent the value $A'/100$ when the feedback signal 79 balances the input signal 71. Contactor 76 and potentiometer 78 form a multiplying circuit wherein the position of shaft 74 is multiplied by the signal of conductor 81 which is, as will be seen, E. Conductor 81 connects amplifier 80 with one end of potentiometer 78, the other end of which is connected to ground. Thus, the signal picked from potentiometer 78 by contactor 76 represents $EA'/100$ or the product of $A'/100$ from the shaft position and E from conductor 81. The signal E from conductor 81 will be driven by high gain amplifier 80 until the product $EA'/100$ in conductor 82 and its associated attenuating resistor 83 are equal to the signal N from analyzer 40 via conductor 84 and its associated attenuating resistor 85. At this time, the junction 86 will be at zero potential and amplifier 80 will cease to drive. Since $EA'/100$ is now equal to N $$\left(\text{or } \frac{EA'}{100}=N\right)$$

it follows that the signal in conductor 81, which was called E, is equal to $100N/A'$. This value E is the catalyst efficiency.

Figure 4:
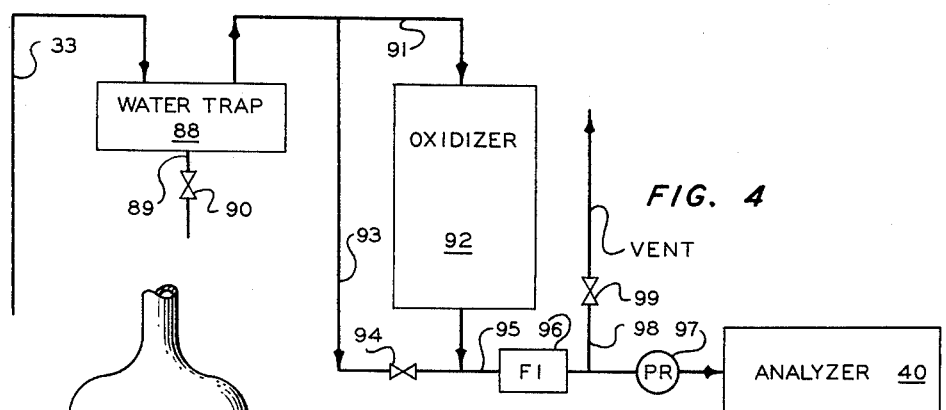
FIGURE 4 is a schematic flow diagram of a preferred oxidizer system for preparing a sample for the nitrogen oxide analyzer.

Referring now to FIGURE 4, a sample stream containing oxides of nitrogen intended for analysis in nitrogen oxides analyzer 40 is passed via sample lines such as conduit 33 to water trap 88 where water is removed via conduit 89 and valve 90. The dried gases pass via conduit 91 to oxidizer 92. A by-pass around oxidizer 92 is provided by conduit 93 and valve 94. The effluent from oxidizer 92 passes via conduit 95, flow indicator 96 and pressure regulator 97 to analyzer 40. Excess gases are vented downstream from flow indicator 96 via conduit 98 and control valve 99.

Figures 5, 6:
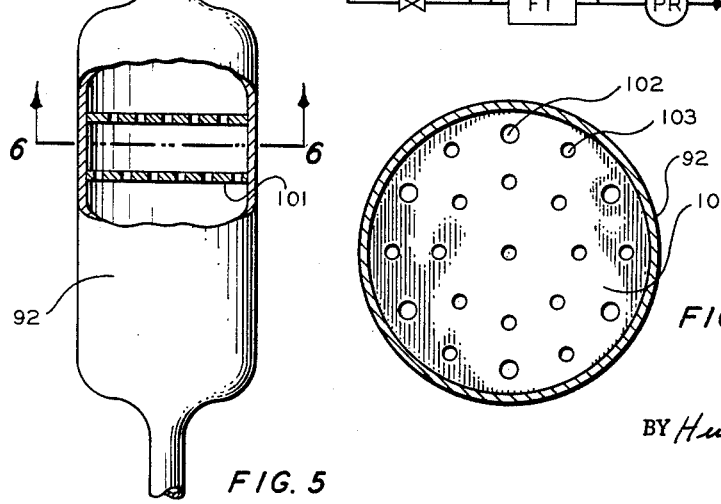
FIGURE 5 is a detail view of oxidizer 92 of FIGURE 4.
FIGURE 6 is a view of FIGURE 5 along line 6—6.

FIGURE 5 shows the construction of oxidizer 92 which contains a plurality of perforated plates 101.

FIGURE 6 is a sectional view of the oxidizer 92 of FIGURE 5 and illustrates the arrangement of the perforations of the plates of oxidizer 92. Perforations 102 of perforated plate 101 are about 20 percent larger than perforations 103.

The circuitry of the production meter 29 of FIGURE 1 is shown in FIGURE 7. The production meter is described and claimed in copending application Serial No. 777,261, filed December 1, 1958, by J. C. Thomas and L. W. Morgan. Referring now to FIGURE 7, an electrical signal proportional to density is produced by density meter 24 of FIGURE 1 and passes by conductor 112 to amplifier 113 where it is amplified to a suitable value. The signal then passes by conductor 114 and its associated attenuating resistor 115 to summing junction 116. Potentiometer 117 is connected at one end to a voltage source, for example, 100 volts, and at its other end to ground. Its contactor 118 is connected to summing junction 116. Adjustment of the contactor 118 of potentiometer 117 calibrates the signal from meter 24 so that the signal at summing junction 116 is directly representative of concentration; for example, 55 volts at summing junction 116 may represent 55 weight percent nitric acid. The signal from summing junction 116 passes by way of summing amplifier 119 and conductor 120 to a servo amplifier 121 and its associated servo motor 122. The servo motor 122 is mechanically linked by shaft 123 to the contactors 124 and 125 of potentiometers 126 and 127, respectively. Potentiometer 126 is connected at one end to a voltage source, for example, 100 volts, and at its other end to ground. Its contactor 124 is connected by conductor 128 to the input of servo amplifier 121 and by loading resistor 129 to ground. As thus described, the servo amplifier 121 will cause the servo motor 122 to rotate shaft 123 and associated contactor 124 of potentiometer 126 such that the relative position of shaft 123 represents acid concentrtaion. An electrical signal proportional to acid flow rate passes from flow meter 27 of FIGURE 1 by means of conductor 131 to amplifier 132 and thence to one end of potentiometer 127, the other end of which is connected to ground. Contactor 125 of potentiometer 127 has been positioned by shaft 123 to represent the acid concentration, and thus the signal from terminal 133, which is connected to contactor 125, represents the product of flow times concentration, or pure acid flow rate.

The maximum temperature operating limit switch is shown in FIGURE 8 as applied to optimizing controller 31 in FIGURE 2. A signal from optimizing controller 31 circuit operates mechanical linkage 140 to manipulate double-pole, double-throw switch 141 which is connected by leads 142 and 143 to a reversible motor (146) and to a source of power (not shown) by leads 144 and 145. Motor 146 manipulates analyzer recording controller 36 by means of linkage 31' to increase or decrease the amount of ammonia passing to mixer 10.

If the temperature in converter 12 reaches the predetermined maximum operating temperature as determined by thermocouple 34, the temperautre recording controller 34a manipulates switch 147 to open the circuit to motor 146 which operates motor 146 in the direction to increase the amount of ammonia passing to mixer 10. In this case motor 146 can be operated only in the direction to reduce the amount of ammonia passing to mixer 10. This is the position of switch illustrated in FIGURE 8.

It is to be understood that motor 146 does not operate continuously, but for short time intervals as directed by a signal from optimizing controller 31 which manipulates linkage 140 to close switch 141 as required.

Density meter 24 can be any instrument for continuously measuring the density of a fluid such as the Densitrol (trademark) available from Precision Thermometer and Instrument Company, Philadelphia, Pennsylvania.

Flow meter 27 can be any electrical type flow meter producing a linear signal proportion to rate of flow, such as, for example, the Potter Flowmeter manufactured by the Potter Aeronautical Corporation, Union, New Jersey.

Nitrogen oxides analyzer 40 can be any conventional instrument suitable for the quantitative determination of nitrogen dioxide ($NO_2$) such as a mass spectrometer or a photoelectric calorimeter.

The temperature recording controllers and flow recording controllers can be controllers such as Foxboro Controller, Model 58, available from the Foxboro Instrument Company, Foxboro, Massachusetts; or Brown Potentiometer Recorder Controller, Type 153, available from the Brown Instrument Company, Philadelphia 44, Pennsylvania.

The analyzer recorder controller 36 of FIGURE 2 can be an instrument such as a Brown Recording Potentiometer Controller, Type 153, available from the Brown Instrument Company, Philadelphia 44, Pennsylvania.

The optimizing controller 31 can be any conventional commercially available instrument which produces a signal output corresponding to the difference between the predicted value of a controlled variable in a system and the actual value at which the system stabilizes after a change in the controlled variable, such as, for example, the Quarie Optimal Controller manufactured by Quarie Controllers, Sharon, Massachusetts.

In order to effect the oxidation reaction, the ratio of ammonia to air in the reaction mixture is closely controlled in order to obtain maximum conversion and efficiency and to minimize the danger of the formation of explosive mixtures. Air-ammonia mixtures containing less than 8 or more than 10.5 volume percent ammonia show too low a conversion efficiency, and the preferred concentration of ammonia in the air-ammonia mixture is within the range of 9.5 to 10.3 volume percent. In order to control the air-ammonia mixture within these limits, a ratio control device is employed to proportion the volume of ammonia gas passing via line 8 to the volume of process air passing via line 9. Any suitable means for controlling the volumetric ratio of air to ammonia can be used. For example, in some instances a single differential ratio flow controller is satisfactory. The preferred instrument is a ratio flow recording controller such as Foxboro Model No. 40 Ratio Controller, available from the Foxboro Instrument Company, Foxboro, Massachusetts.

The ammonia-to-air ratio analyzer 14 can be a differential thermal conductivity sensing instrument which compares the mixture of ammonia and air with air by means of a Wheatstone bridge circuit.

Reasonable variations and modifications are possible within the scope of the present disclosure without departing from the spirit and scope of the invention.

That which is claimed is:

1. In a plant for producing nitric acid including a catalytic ammonia oxidizer, a conduit supplying ammonia to said ammonia oxidizer, a conduit supplying air to said ammonia oxidizer, means for adding heat to the air in said conduit, an absorption column, means for supplying water to said absorption column, means for supplying the ammonia oxidizer effluent and additional air to said absorption column, and a conduit for removing nitric acid from said absorption column, an improved control system which comprises, in combination, a first analyzer means operatively connected to said conduits for supplying ammonia and air to the ammonia oxidizer so as to determine the ratio of ammonia to air passing to said ammonia oxidizer; a ratio controller operatively connected to said first analyzer and to said ammonia conduit to control the flow of ammonia in response to a signal from said analyzer; a second analyzer means operatively connected to the effluent from said ammonia oxidizer to determine the nitrogen oxide content of said effluent; a catalyst efficiency computer operatively connected to said first and second analyzers to compare the signals from said analyzers and to produce a signal indicative of the efficiency of said catalyst in said ammonia oxidizer; optimizing controller means; means operatively connected to said optimizing controller, to said catalyst efficiency computer and to said ratio controller to periodically adjust the quantity of ammonia passing to said ammonia oxidizer, to compare the efficiency of the catalyst after the adjustment with the efficiency of the catalyst prior to the adjustment, and to select the adjustment at which the catalyst efficiency is the greatest; means operatively connected to said optimizing controller, to said catalyst efficiency computer and to said means for adding heat to the air in the conduit for supplying air to said ammonia oxidizer to periodically adjust the amount of heat added to the air passing to the ammonia oxidizer, to compare the efficiency of the catalyst after the adjustment with the efficiency of the catalyst prior to the adjustment, and to select the adjustment at which the catalyst efficiency is the greatest; a production meter means operatively connected to the conduit for removing nitric acid from said absorber to measure and compare nitric acid concentration and rate of flow and to produce a signal indicative of nitric acid production rate; and means operatively connected to said optimizing controller, to said production meter and to said conduit for supplying air to said ammonia oxidizer to periodically adjust the flow of air passing to said ammonia oxidizer, to compare the nitric acid production rate after the adjustment with the nitric acid production rate prior to the adjustment, and to select the adjustment at which the nitric acid production rate is the greatest.

2. In a plant for producing nitric acid including a catalytic ammonia oxidizer, a conduit supplying ammonia to said ammonia oxidizer, a conduit supplying air to said ammonia oxidizer, means for adding heat to the air in said conduit, an absorption column, means for supplying water to said absorption column, means for supplying the ammonia oxidizer effluent and additional air to said absorption column, and a conduit for removing nitric acid from said absorption column, an improved control system which comprises, in combination, a first analyzer means operatively connected to said conduits for supplying ammonia and air to said ammonia oxidizer to determine the ratio of ammonia to air passing to said ammonia oxidizer; a ratio controller operatively connected to said first analyzer and to said ammonia conduit to control the flow of ammonia in response to a signal from said analyzer; a second analyzer means operatively connected to the effluent from said ammonia oxidizer to determine the nitrogen oxide content of said effluent; a catalyst efficiency computer operatively connected to said first and second analyzers to compare the signals from said analyzers and to produce a signal indicative of the efficiency of said catalyst in said ammonia oxidizers; and an optimizing controller means operatively connected to said catalyst efficiency computer and to said ratio controller to periodically adjust the quantity of ammonia passing to said ammonia oxidizer, to compare the efficiency of the catalyst after the adjustment with the efficiency of the catalyst prior to the adjustment, and to select the adjustment at which the catalyst efficiency is the greatest.

3. In a plant for producing nitric acid including a catalytic ammonia oxidizer, a conduit supplying ammonia to said ammonia oxidizer, a conduit supplying air to said ammonia oxidizer, means for adding heat to the air in said conduit, an absorption column, means for supplying water to said absorption column, means for supplying the ammonia oxidizer effluent and additional air to said absorption column, and a conduit for removing nitric acid from said absorption column, an improved control system which comprises, in combination, a first analyzer means operatively connected to said conduits for supplying ammonia and air to said ammonia oxidizer to determine the ratio of ammonia to air passing to said ammonia oxidizer; a ratio controller operatively connected to said first analyzer and to said ammonia conduit to control the flow of ammonia in response to a signal from said analyzer; a second analyzer means operatively connected to the effluent from said ammonia oxidizer to determine the nitrogen oxide content of said effluent; a catalyst efficiency computer operatively connected to said first and second analyzers to compare the signals from said analyzers and to produce a signal indicative of the efficiency of said catalyst in said ammonia oxidizer; and an optimizing controller means operatively connected to said catalyst efficiency computer and to said means for adding heat to the air in the conduit for supplying air to said ammonia oxidizer to periodically adjust the amount of heat added to the air passing to the ammonia oxidizer, to compare the efficiency of the catalyst after the adjustment with the efficiency of the catalyst prior to the adjustment, and to select the adjustment at which the catalyst efficiency is the greatest.

4. In a plant for producing nitric acid including a catalytic ammonia oxidizer, a conduit supplying ammonia to said ammonia oxidizer, a conduit supplying air to said ammonia oxidizer, an absorption column, means for supplying water to said absorption column, means for supplying the ammonia oxidizer effluent and additional air to said absorption column, and a conduit for removing nitric acid from said absorption column, an improved control system which comprises, in combination, a production meter means operatively connected to the conduit for removing nitric acid from said absorber to measure and compare nitric acid concentration and rate of flow and to produce a signal indicative of nitric acid production rate; and an optimizing controller means operatively connected to said production meter and to said conduit for supplying air to said ammonia oxidizer to periodically adjust the flow of air passing to said ammonia oxidizer, to compare the nitric acid production rate after the adjustment with the nitric acid production rate prior to the adjustment, and to select the adjustment at which the nitric acid production rate is the greatest.

5. In a plant for producing nitric acid including a catalytic ammonia oxidizer, a conduit supplying ammonia to said ammonia oxidizer, a conduit supplying air to said ammonia oxidizer, an absorption column, means for supplying water to said absorption column, means for supplying the ammonia oxidizer effluent and additional air to said absorption column, and a conduit for removing nitric acid from said absorption column, an improved control system which comprises, in combination, a first analyzer means operatively connected to said conduits for supplying ammonia and air to said ammonia oxidizer to determine the ratio of ammonia to air passing to said ammonia oxidizer; a ratio controller operatively connected to said first analyzer and to said ammonia conduit to control the flow of ammonia in response to a signal from said analyzer; a second analyzer means operatively connected to the effluent from said ammonia oxidizer to determine the nitrogen oxide content of said effluent; a catalyst efficiency computer operatively connected to said first and second analyzers to compare the signals from said analyzers and to produce a signal indicative of the efficiency of said catalyst in said ammonia oxidizer; a first optimizing controller means operatively connected to said catalyst efficiency computer and to said ratio controller to periodically adjust the quantity of ammonia passing to said ammonia oxidizer, to compare the efficiency of the catalyst after the adjustment with the efficiency of the catalyst prior to the adjustment, and to select the adjustment at which the catalyst efficiency is the greatest; a production meter means operatively connected to the conduit for removing nitric acid from said absorber to measure and compare nitric acid concentration and rate of flow and to produce a signal indicative of nitric acid production rate; and a second optimizing controller means operatively connected to said production meter and to said conduit for supplying air to said ammonia oxidizer to periodically adjust the flow of air passing to said ammonia oxidizer, to compare the nitric acid production rate after the adjustment with the nitric acid adjustment rate prior to the adjustment, and to select the adjustment at which the nitric acid production rate is the greatest.

6. In a plant for producing nitric acid including a catalytic ammonia oxidizer, a conduit supplying ammonia to said ammonia oxidizer, a conduit supplying air to said ammonia oxidizer, means for adding heat to the air in said conduit, an absorption column, means for supplying water to said absorption column, means for supplying the ammonia oxidizer effluent and additional air to said absorption column, and a conduit for removing nitric acid from said absorption column, an improved control system which comprises, in combination, a first analyzer means operatively connected to said conduits for supplying ammonia and air to said ammonia oxidizer to determine the ratio of ammonia to air passing to said ammonia oxidizer; a ratio controller operatively connected to said first analyzer and said ammonia conduit to control the flow of ammonia in response to a signal from said analyzer; a second analyzer means operatively connected to the effluent from said ammonia oxidizer to determine the nitrogen oxide content of said effluent; a catalyst efficiency computer operatively connected to said first and second analyzers to compare the signals from said analyzers and to produce a signal indicative of the efficiency of said catalyst in said ammonia oxidizer; a first optimizing controller means operatively connected to said catalyst efficiency computer and to said means for adding heat to the air in the conduit for supplying air to said ammonia oxidizer to periodically adjust the amount of heat added to the air passing to the ammonia oxidizer, to compare the efficiency of the catalyst after the adjustment with the efficiency of the catalyst prior to the adjustment, and to select the adjustment at which the catalyst efficiency is the greatest; a production meter means operatively connected to the conduit for removing nitric acid from said absorption column to measure and compare nitric acid concentration and rate of flow and to produce a signal indicative of nitric acid production rate; and a second optimizing controller means operatively connected to said production meter and to said conduit for supplying air to said ammonia oxidizer to periodically adjust the flow of air passing to said ammonia oxidizer, to compare the nitric acid production rate after the adjustment with the nitric acid production rate prior to the adjustment, and to select the adjustment at which the nitric acid production rate is the greatest.

References Cited in the file of this patent

UNITED STATES PATENTS

| | | |
|---|---|---|
| 1,450,023 | Edelman | Mar. 27, 1923 |
| 1,923,865 | Handforth | Aug. 22, 1933 |
| 2,288,943 | Eastman | July 7, 1942 |
| 2,344,770 | Gunness | Mar. 21, 1944 |
| 2,577,720 | Waller | Dec. 4, 1951 |
| 2,606,875 | Rosenblatt et al. | Aug. 12, 1952 |
| 2,697,652 | Ribble et al. | Dec. 21, 1954 |

OTHER REFERENCES

I. and E. Chem., vol. 45, No. 7, July 1953 (Inskeep), pages 1386–1395.

White: "Instruments and Automation," vol. 29, November 1956, pages 2212–2216.